March 12, 1929. P. G. POOLE 1,705,204
MEANS FOR STONING TRAYS AND THE LIKE
Filed March 10, 1927  6 Sheets-Sheet 6

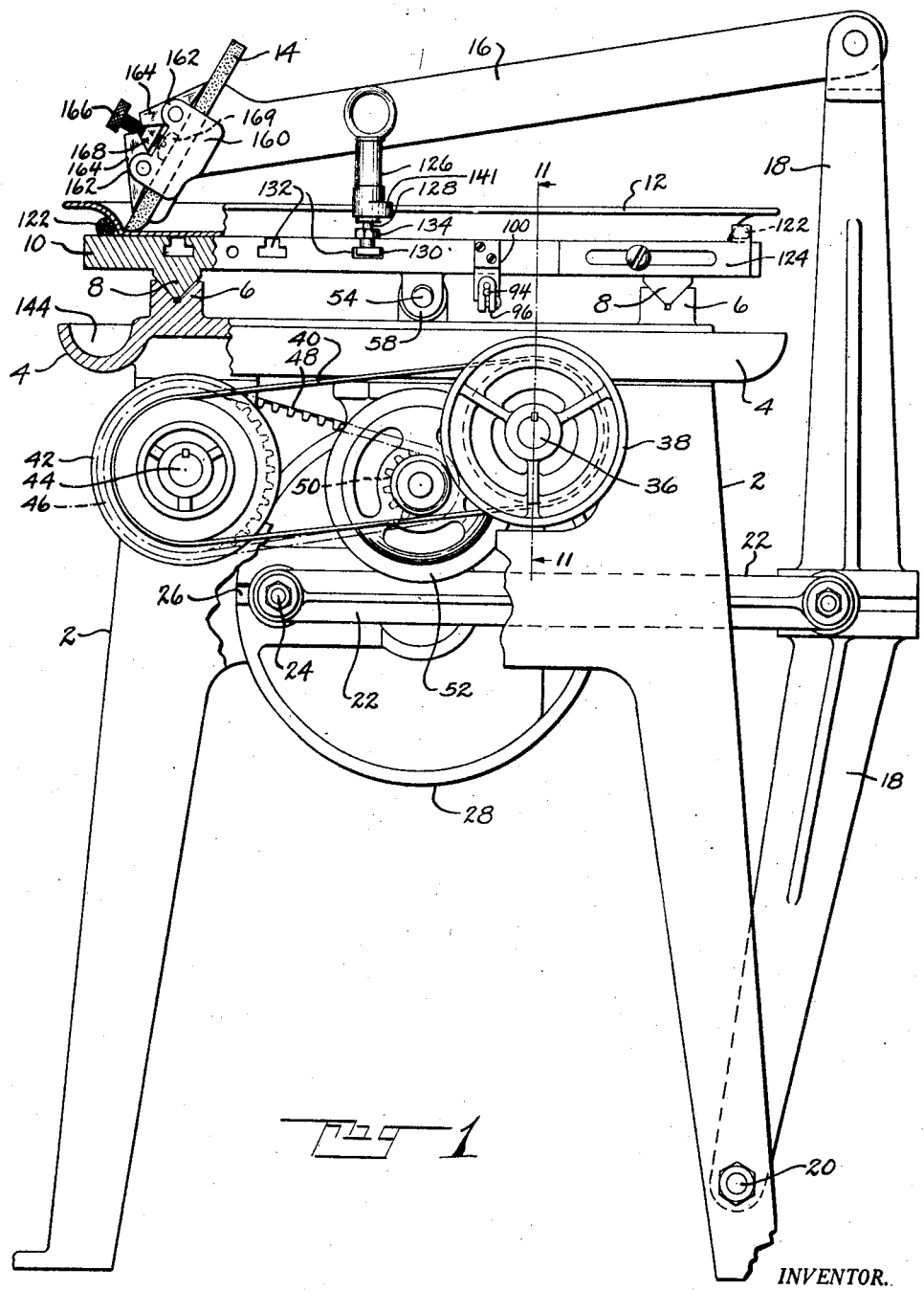

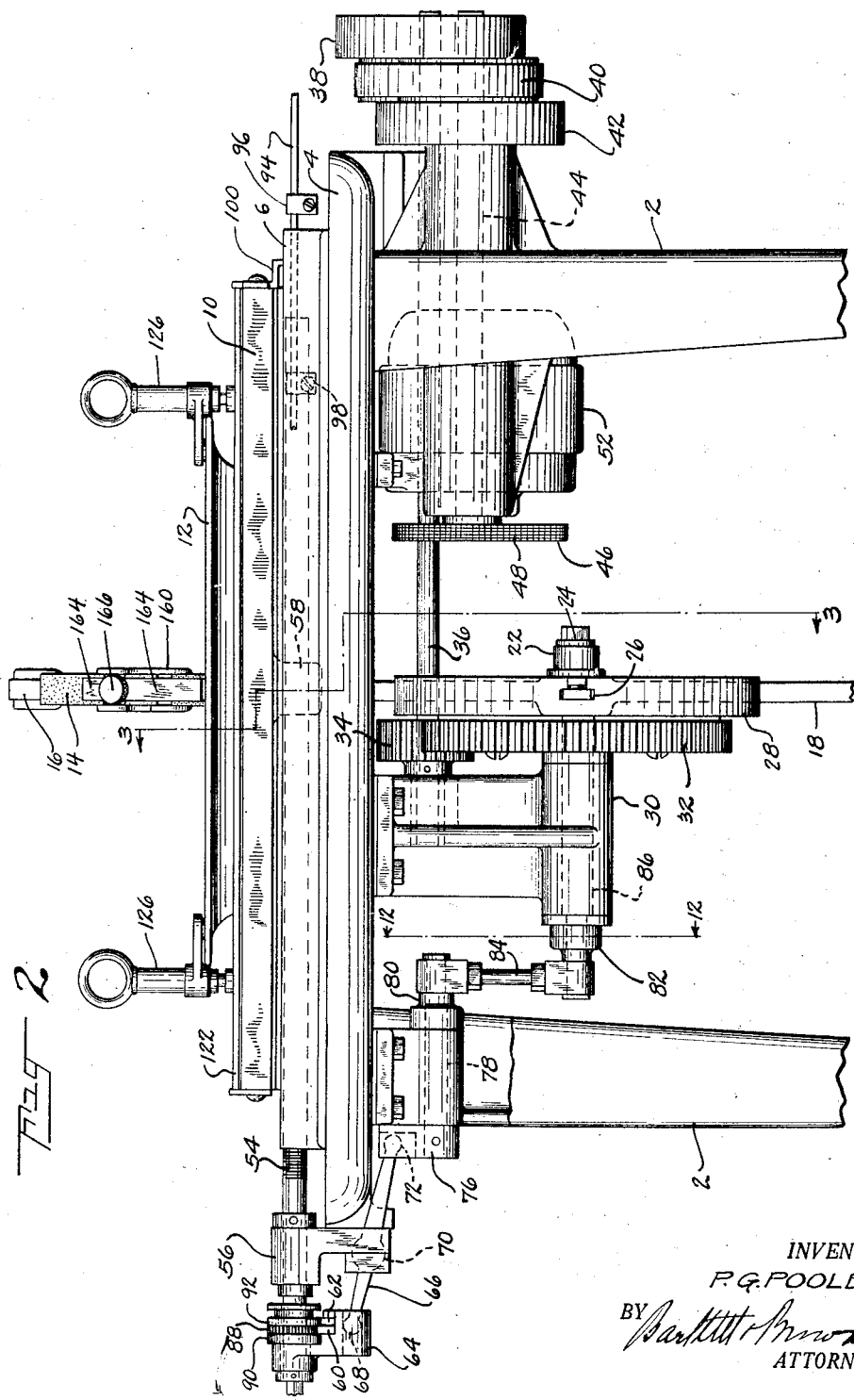

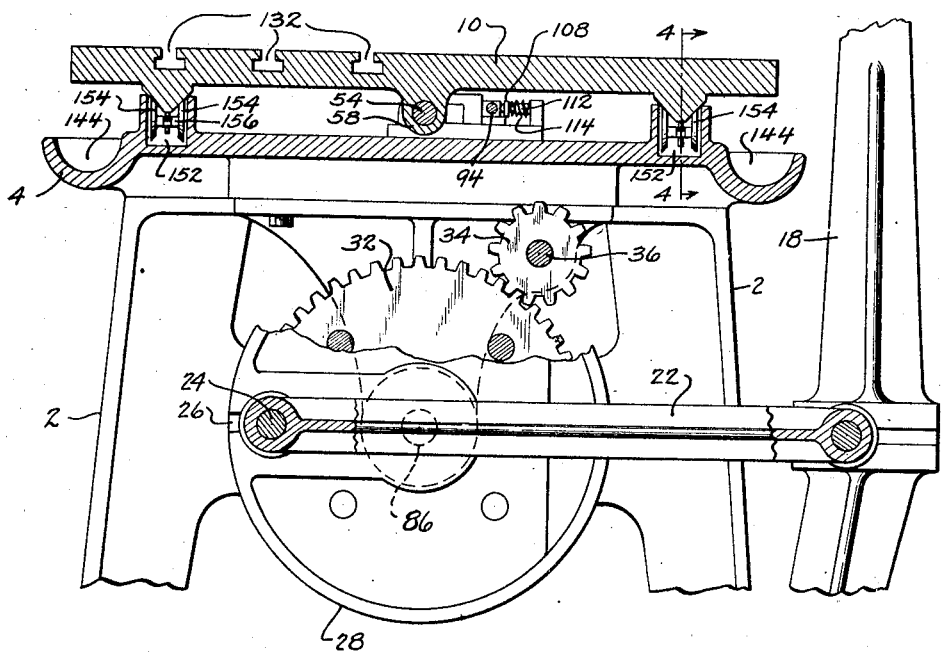
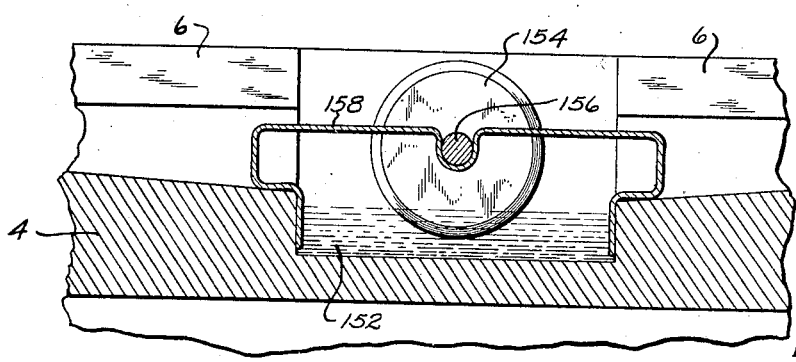

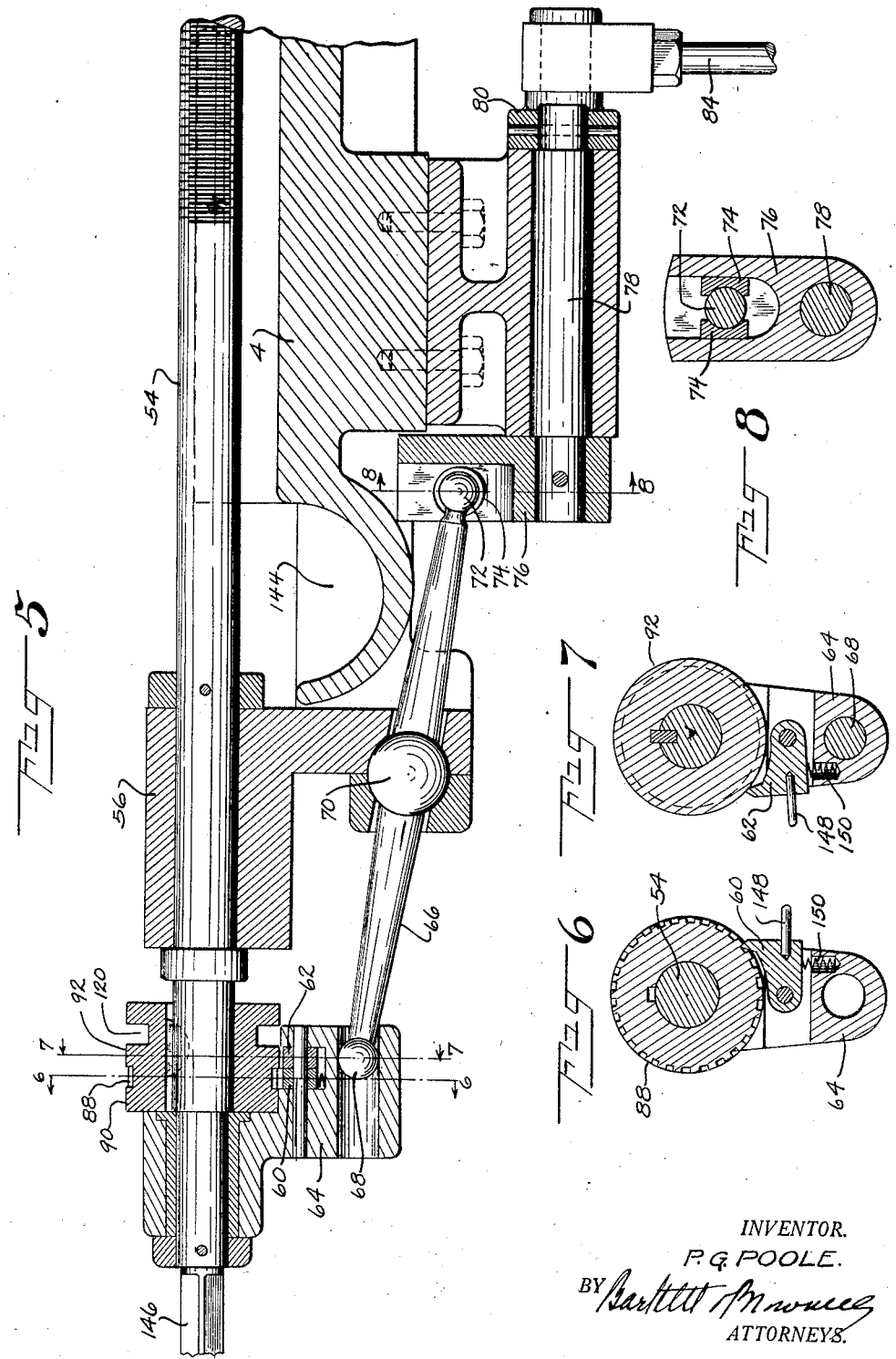

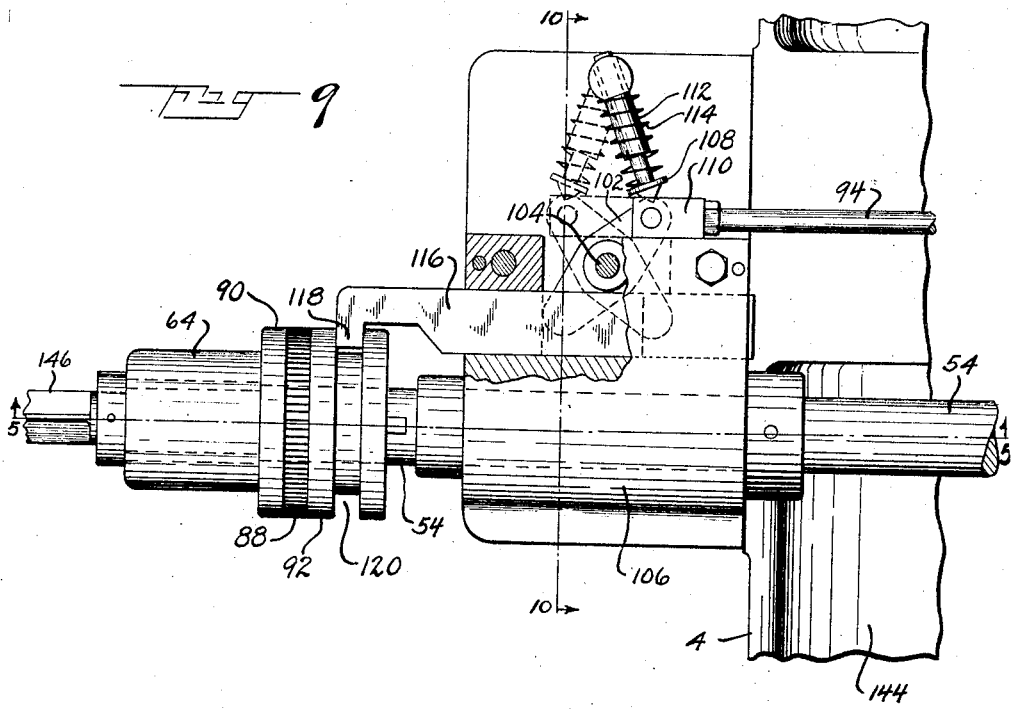
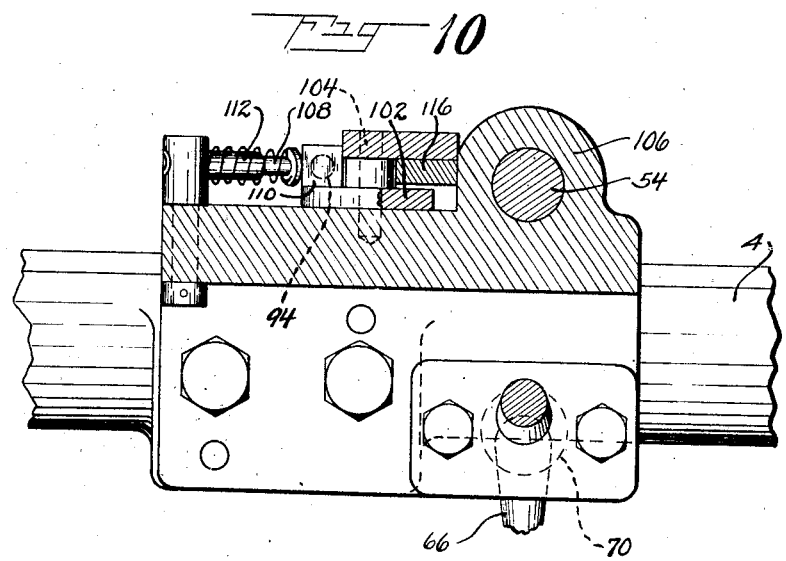

INVENTOR.
P. G. POOLE
BY
ATTORNEYS.

Patented Mar. 12, 1929.

1,705,204

UNITED STATES PATENT OFFICE.

PAGE G. POOLE, OF MERIDEN, CONNECTICUT, ASSIGNOR TO INTERNATIONAL SILVER COMPANY, OF MERIDEN, CONNECTICUT, A CORPORATION OF NEW JERSEY.

MEANS FOR STONING TRAYS AND THE LIKE.

Application filed March 10, 1927. Serial No. 174,311.

My invention relates to means for stoning trays and the like and has for its object to provide an automatic machine for stoning trays and similar articles which will perform the stoning operation heretofore performed by hand labor. It further has for its object to provide a machine in which a stone is caused to reciprocate in a plate at right angles to the surface to be stoned and oscillated in said plane during each movement of reciprocation and in which the article to be stoned is moved longitudinally at an angle to the movement of reciprocation of the stone. It further has for its object to provide a machine in which the movement of the article to be stoned is automatically reversed as many times as desired. It further has for its object to provide a machine which will produce superior results to those heretofore obtainable and with a saving in labor cost.

The following is a description of my invention reference being had to the accompanying drawings, in which:

Figure 1 shows an end elevation of a machine embodying my invention;

Fig. 2 is a front elevation of the same;

Fig. 3 is a section on the line 3—3, Fig. 2;

Fig. 4 is an enlarged section in detail on the line 4—4, Fig. 3;

Fig. 5 is a section on the line 5—5, Fig. 9;

Fig. 6 is a section on the line 6—6, Fig. 5;

Fig. 7 is a section on the line 7—7, Fig. 5;

Fig. 8 is a section on the line 8—8, Fig. 5;

Fig. 9 is an enlarged detail of a portion of the traverse changing mechanism;

Fig. 10 is a section on the line 10—10, Fig. 9;

Figure 11:
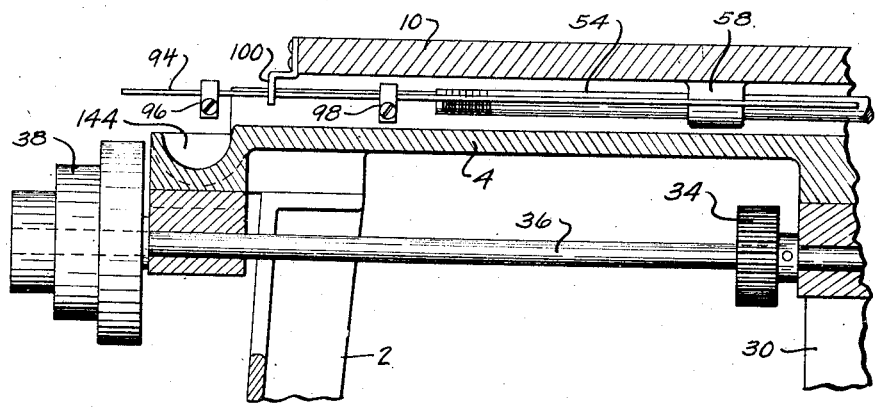
Fig. 11 is a section on the line 11—11, Fig. 1.
Figure 12:
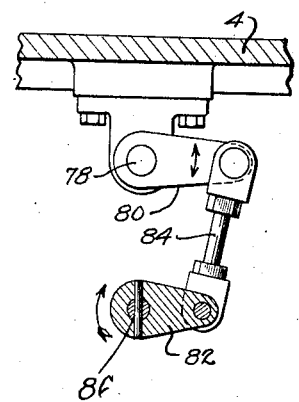
Fig. 12 shows a detail partially in section on the line 12—12, Fig. 2.
Figure 13:
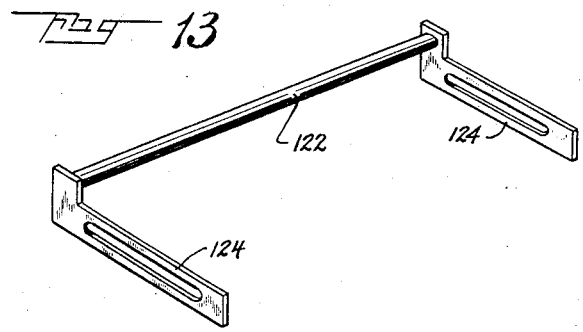
Fig. 13 is a perspective detail of one of the tray holding stops.

Referring more particularly to the drawings, 2 is the base of the machine having a top 4 provided with slide rails 6 with which engage runners 8 of a movable horizontal table 10 on which a tray or similar object 12 to be stoned is secured.

14 is the stone, being of the nature ordinarily used for hand-stoning, which is secured to and carried by an arm 16 pivotally connected to the load arm of a lever 18 which is fulcrumed at 20, so as to constitute a lever of the third class, and driven by a link 22 connected to a crank pin 24 adjustably secured in a slot 26 in a disk 28 mounted on a shaft journaled in the bracket 30 carried by the bed of the machine.

To the disk 28 is connected a gear 32 which meshes with a pinion 34 carried by a shaft 36, the other end of which carries a cone-pulley 38 driven through a belt 40 and a second cone-pulley 42 which is mounted on a shaft 44 carrying a sprocket wheel 46 which is driven through a chain 48 by a sprocket wheel 50 mounted on the shaft of an electric motor 52 supported beneath the base.

As the motor revolves the lever 18, together with the arm 16 and stone carried thereby, is reciprocated, the length of the stroke depending upon the adjustment of the crank pin 24. The arm 16 is of sufficient weight to keep the stone in the desired contact with the article to be stoned so that it grinds or polishes the surface over which it is reciprocated, the purpose of this grinding or polishing being to remove any unevenness due to any hammering or the like of the article so as to provide a plain surface which can be given a mirror-like finish highly desirable in trays and similar articles.

As the stone is reciprocated in the manner above described, the tray is moved slowly by a step-by-step action in a direction transverse to the movement of such reciprocation. This movement of the tray is brought about by a screw 54, one end of which is carried in a bearing 56 secured to the base, and the other end of which engages a screw-threaded lug 58 on the bottom of the moving table. This screw is caused to revolve in one direction or the other by pawls 60 and 62 which are pivotally connected to a swinging arm 64 carried by the end of the screw 54 and oscillating about its axis. This movement of oscillation is produced by a lever 66 having a ball-head 68 and a spherical bearing 70 in a bracket 56 and a second ball-head 72 which engages bearing members 74 slidingly mounted in a channel in a crank arm 76 carried by a shaft 78 to which is connected a crank arm 80, caused to reciprocate by a revolving crank 82 connected thereto by a link 84. The crank 82 is driven by the shaft 86 carrying a disk 28 and gear 32. As the shaft 86 revolves the member 64 is caused to oscillate by the means described so that the pawl 60 or 62 as the case may be, engaging the ratchet wheel 88 causes the screw 54 to revolve in one direction or the other according to whether the pawl 60 or the pawl 62 engages the ratchet wheel. This ratchet wheel as shown, has square-topped teeth so that the two pawls 60 or 62 may make similar engagement with the two sides of the teeth, respectively, this engagement being one pawl at a time depending upon how the ratchet wheel 88 is positioned longitudinally upon the screw 54.

On each side of the ratchet wheel 88 and integral therewith are two plain disks 90 and 92 of the same diameter as the ratchet wheel so that when one pawl is in engagement with the ratchet wheel the other pawl is in engagement with one of said plain disks. The ratchet wheel 88, together with the plain disks is shifted out of engagement with one pawl and into engagement with the other pawl automatically whenever the table carrying the article to be stoned is moved a predetermined and adjustable distance in one direction or the other. This is brought about by a rod 94 carrying adjustable stop members 96 and 98 which are engaged by an actuating device or bracket 100 carried by the table 10 and the other end of which is pivotally connected to a lever 102 fulcrumed at 104 on a bracket 106 secured to the base of the machine. In order to cause this lever to complete its throw after it has passed the dead center I provide a spring-pressed pin 108 having a pointed head which engages a recess in the head 110 carried by the rod 94 and telescopes within an oscillating socket 112 also carried by said bracket. The spring 114 acting to force the pin 108 out of the socket 112 provides the desired spring action. The other end of the lever 102 extends into a recess in a slide 116 which is carried by said bracket and has a hook-end 118 engaging an annular recess 120 is the member comprising the ratchet wheel 88 and plain disks 90 and 92 which are rigidly secured together.

When the table reached one end of its traverse the bracket 100 engages one of the stops 96, 98 causing the rod to shift the lever 102 until it passes the dead center whereupon the spring pin 108 causes it to complete its throw by a quick movement, thus shifting its slide 116 and the ratchet wheel 88 with its accompanying plain disks in one direction or the other so as to move the ratchet wheel out of the plane of one of the pawls 60 and 62 and into the plane of the other, resulting in a reversal of movement of rotation of the screw 54 and a reversal of the movement of the table 10. The ratchet wheel 88 shifts under the action of the spring 114 when the face of one of its teeth raises the engaging pawl into line with the surface of the plain disks 90 and 92. At that moment the ratchet wheel is free to move axially so as to produce a reversal. These reversals will continue as long as the machine is kept in operation so that the article to be stoned can be caused to move transversely under the stone as many times as desired.

Figure 14:
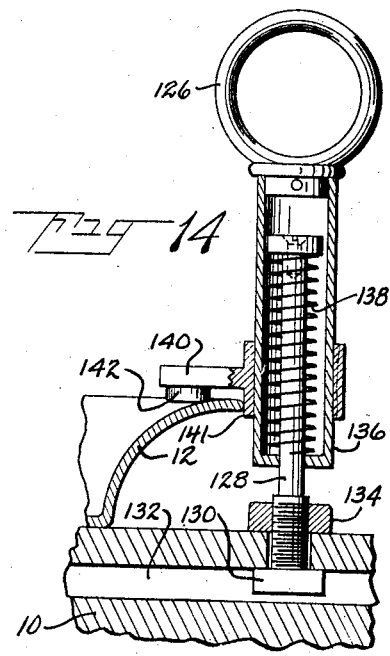
Fig. 14 is a detail partially in section of a spring clip for holding the article to be stoned.

In order to hold the article to be stoned to the table I provide two adjustable stops 122 having cross-bars and slotted arms 124 through which binding screws pass holding the same to the table, so that those stops can be adjusted for trays and the like of different size. In order to hold the tray down between the stops I provide two spring-clips 126, each comprising a post 128 having a square head 130 adapted to be slid into one of the slots 132 on the table and clamped in position by a nut 134. The post is surrounded by a tubular shell 136 (Fig. 14) within which is a spring 138 engaging suitable abutments on the top of the post and at the bottom of the shell. The shell is provided with a finger 140 having a rubber tip 142 which engages the tray or other article and is held against the same by the pressure of the spring 138. The finger is provided with an eccentric cam 141 which as the shell 136 is turned axially engages or disengages the edge of the tray. The shell is also provided with a finger-ring 126 for lifting the same.

Inasmuch as water is used in the stoning operation the base of the machine is provided with a gutter 144 for catching such water.

The screw 54 is provided with a square head 146 adapted to receive a crank handle so that it can be turned by hand for the purpose of manually adjusting the position of the table when desired. In order to permit such manual adjustment the pawls 90 and 91 are provided with handles 148 so that they can be retracted at this time and thus withdrawn out of engagement with the ratchet wheel 88 if necessary, this withdrawal being against the action of the compression springs 150 which normally tend to hold the pawls in elevated position and in engagement with the ratchet teeth when in the plane of either of said pawls.

The bracket 100 not only acts as a means for shifting the rod 94 but also acts to support the free end of said rod.

The stone 14 is held in the arm 16 by any suitable clamp. I have devised a clamp for holding the stone, the same consisting of a slotted head 160 having two pairs of lugs 162. Between each pair is a lever 164 between which passes a turn screw 166 engaging a tapered nut 168 and having a swiveled washer 169 on its end. As the screw 166 is turned inward, its inner end engages the stone 14 and the nut 168 riding along the screw engages the power arms of the levers 164 causing those levers to turn so as to grip the stone 14 at points remote from the screw, so that the stone is firmly held at three points.

In order to more thoroughly lubricate the rails and runners 6 and 8, I provide in each rail on oil well 152 containing oil in which dip two oil transfer wheels 154, connected together by a shaft 156, against the lower side of which presses a spring 158 whose free ends extend into the well as shown in Fig. 4, holding the transfer wheels in engagement with the lower surface of the runners 8.

The lever 18 oscillates toward and from a vertical position. This results in a rocking movement of the stone about an axis at right angles to its plane of reciprocation. This results in forming a curved cutting surface ending in an edge lying in the plane of the face of the stone. This rocking motion relieves the cuttings produced by the stone and results in continually presenting a fresh cutting face to the surface of the article being stoned and is an important feature in the operation.

As in ordinary hand-stoning, the tray is kept flooded with water. In the operation of my machine the stone is mechanically rocked or oscillated and the water cleanses the portions of the face of the stone as soon as such portions have performed their grinding action and been lifted by the rocking motion so as to be exposed to the action of the water. The water also holds in suspension the articles of metal which have been removed in the stoning action so that they are carried away from the stone by the currents produced by moving the stone so as not to scratch the surface of the article being stoned. The reciprocating and oscillating motions keep the face of the stone contacting with the article curved in the plane of its movements.

With this machine, if the surface to be stoned is square, the stoning can be fully accomplished by the machine described. If, however, it has rounded corners or curved sides, the major portion of the surface, comprising a parallelogram or a square ended cross, can be stoned by the machine leaving only corners or bowed out surfaces to be stoned by hand. In stoning the cross-shaped surface the tray is turned 90° after it is partially stoned.

The machine not only produces superior results but inasmuch as two or more machines can be attended by one operator results in a very material saving in time and labor. Furthermore, the operation of stoning is one which is an unpleasant operation, disagreeable to the operators, and for which it is difficult to find satisfactory labor. The machine, therefore, not only does better work but solves the problem of obtaining labor for accomplishing the desired results.

As will be evident to those skilled in the art, my invention permits of various modifications without departing from the spirit thereof or the scope of the appended claims.

What I claim is:

1. In a stoning machine the combination of a base, a table thereon, means for causing said table to move along said base, a stone, means for supporting said stone in stoning relation to an article upon said table, and means for reciprocating and oscillating said stone in a direction at right angles to the movement of said table so as to maintain a curved cutting face thereon, and means for automatically reversing the movement of said table after it has moved a predetermined distance.

2. In a stoning machine the combination of a base, a table thereon, and means for moving said table along said base, a lever having its load arm extending above said table, and an arm pivoted to said load arm, a stone carried by said pivoted arm and oscillated thereby, said stone engaging an article carried by said table, and means for reciprocating said lever in a plane at an angle to the direction of movement of said table.

3. In a stoning machine the combination of a base, a table carried thereby and movable along said base, a screw for moving said table in said direction, means controlled by said table for reversing the movement of said screw, a stone carrier tending to move toward said table, a stone carried by said carrier, said stone engaging an article to be stoned secured to said table, and means for reciprocating and oscillating said stone carrier in a direction at an angle to the movement of said table so as to maintain a curved cutting face thereon.

4. In a stoning machine, a table having a surface for supporting the article to be stoned, an actuating member having, when in action, a portion oscillating toward and from the plane of the article supporting surface of said table, a stone, an elongated stone carrier therefor, positioned by said stone and said oscillating portion, one end being supported by said stone as it bears on the article to be stoned and tending to move toward said table and the other end being pivotally supported by said oscillating portion, and means for moving said actuating member.

5. In a stoning machine, a horizontal table having an upper surface for supporting the article to be stoned, an actuating member having, when in action, a portion located above and oscillating toward and from the plane of the article supporting surface of said table, a stone, an elongated stone carrier therefor, positioned by said stone and said oscillating portion, one end being supported by said stone as it bears on the article to be stoned and tending to move toward said table under the action of gravity and the other end being pivotally supported by said oscillating portion, and means for moving said actuating member.

6. In a stoning machine, a horizontal table having a surface for supporting the article to be stoned, an actuating lever having a portion of its load arm above said table and oscillating toward and from the plane of the article supporting surface of said table, a stone, an elongated stone carrier therefor positioned by said stone and the load arm of said actuating lever, one end being supported by said stone as it bears on the article to be stoned and tending to move toward said table under the action of gravity, and the other end being supported by and pivotally connected to said oscillating load arm at a point above said surface, and means for moving said actuating lever.

In testimony whereof, I have signed my name to this specification this 8th day of March, 1927.

PAGE G. POOLE.